United States Patent
Hirschi et al.

(10) Patent No.: US 6,448,329 B1
(45) Date of Patent: Sep. 10, 2002

(54) SILICONE COMPOSITION AND THERMALLY CONDUCTIVE CURED SILICONE PRODUCT

(75) Inventors: David Dean Hirschi, Midland; Michael Andrew Lutz, Hope, both of MI (US)

(73) Assignee: Dow Corning Corporation, Midland, MI (US)

( * ) Notice: Subject to any disclaimer, the term of this patent is extended or adjusted under 35 U.S.C. 154(b) by 24 days.

(21) Appl. No.: 09/796,225

(22) Filed: Feb. 28, 2001

(51) Int. Cl.$^7$ .................... C08L 83/05; C08L 83/07
(52) U.S. Cl. .................... 524/588; 528/15; 528/12; 528/31; 528/32; 524/858; 524/437; 525/478; 525/474
(58) Field of Search ............ 528/15, 12, 31, 528/32; 524/588, 858, 437; 525/478, 474

(56) References Cited

U.S. PATENT DOCUMENTS

| | | | |
|---|---|---|---|
| 4,444,944 A | 4/1984 | Matsushita | 524/786 |
| 5,008,307 A | 4/1991 | Inomata | 523/220 |
| 6,025,435 A | 2/2000 | Yamakawa et al. | 524/862 |
| 6,169,142 B1 | 1/2001 | Nakano et al. | 524/862 |
| 6,225,433 B1 * | 5/2001 | Isshiki et al. | |

FOREIGN PATENT DOCUMENTS

| | | | |
|---|---|---|---|
| EP | 0496419 A2 | 7/1992 | C08L/83/04 |
| JP | 10030059 A | 2/1998 | C08K/3/04 |

* cited by examiner

Primary Examiner—Robert Dawson
Assistant Examiner—Kuo-Liang Peng
(74) Attorney, Agent, or Firm—Larry A. Milco

(57) ABSTRACT

A silicone composition for preparing a cured silicone product, the composition comprising (A) an organopolysiloxane containing an average of at least two silicon-bonded alkenyl groups per molecule; (B) an organohydrogenpolysiloxane containing an average of at least two silicon-bonded hydrogen atoms per molecule in a concentration sufficient to cure the composition; (C) an alumina filler in a concentration sufficient to impart thermal conductivity to the cured silicone product; (D) an effective amount product; (D) an effective amount of a polyether; and (E) a catalytic amount of a hydrosilylation catalyst. A cured silicone product comprising a reaction product of the silicon composition.

20 Claims, No Drawings

SILICONE COMPOSITION AND THERMALLY CONDUCTIVE CURED SILICONE PRODUCT

FIELD OF THE INVENTION

The present invention relates to a silicone composition and more particularly to an addition-curable silicone composition containing an alumina filler and a polyether. The present invention also relates to a thermally conductive cured silicone product formed from the silicone composition.

BACKGROUND OF THE INVENTION

Silicones are useful in a variety of applications by virtue of their unique combination of properties, including high thermal stability, good moisture resistance, excellent flexibility, high ionic purity, low alpha particle emissions, and good adhesion to various substrates. For example, silicones are widely used in the automotive, electronic, construction, appliance, and aerospace industries.

Addition-curable silicone compositions comprising an alkenyl-containing organopolysiloxane, an organohydrogenpolysiloxane, an alumina filler, and a hydrosilylation catalyst are known in the art. Illustrative of such compositions are U.S. Pat. No. 4,444,944 to Matsushita; U.S. Pat. No. 5,008,307 to Inomata; U.S. Pat. No. 6,025,435 to Yamakawa et al.; U.S. Pat. No. 6,169,142 to Nakano et al.; and EP 496419 to Fujiki et al.

However, conventional silicone compositions containing an alumina filler exhibit little or no thixotropy, rendering them unsuitable for some applications, such as fabrication of certain electronic packages that require formation of silicone deposits on well-defined regions of a substrate. Under the shear conditions typically encountered during application, viscous silicone PSA compositions exhibit a pronounced tendency to adhere to the surface of the dispenser or coating device, forming a continuous string of adhesive between the device and the deposit. This condition can result in contamination of the substrate. Also, viscous silicone compositions typically have lower dispense rates relative to compositions having moderate or low viscosities. On the other hand, low viscosity silicone compositions have a tendency to sag or flow beyond the initial boundaries of the deposit. Furthermore, relatively thick films cannot be readily prepared in a single application from low viscosity silicone compositions.

Although silica having a high surface area, such as fumed or precipitated silica, is typically added to a silicone composition to increase thixotropy, the addition of even small amounts of silica to a silicone composition containing an alumina filler can cause a significant increase in viscosity and attendant decrease in dispense rate.

Consequently, there is a need for a thixotropic addition-curable silicone composition that cures to form a thermally conductive silicone product.

SUMMARY OF THE INVENTION

The present inventors have discovered that an addition-curable silicone composition containing an alumina filler and a polyether has unexpectedly high thixotropy. Specifically, the present invention is directed to a silicone composition for preparing a cured silicone product, the composition comprising:

(A) an organopolysiloxane containing an average of at least two silicon-bonded alkenyl groups per molecule;

(B) an organohydrogenpolysiloxane containing an average of at least two silicon-bonded hydrogen atoms per molecule in a concentration sufficient to cure the composition;

(C) an alumina filler in a concentration sufficient to impart thermal conductivity to the cured silicone product;

(D) an effective amount of a polyether; and (E) a catalytic amount of a hydrosilylation catalyst.

The present invention is also directed to a cured silicone product comprising a reaction product of the above-described composition.

The present invention is further directed to a multi-part silicone composition for preparing a cured silicone product, the composition comprising component (A) through (E) in two or more parts, provided components (A), (B), and (E) are not present in the same part.

The silicone composition of the present invention has numerous advantages, including adjustable thixotropy, low VOC (volatile organic compound) content, and adjustable cure. Moreover, the silicone composition cures to form a silicone product having good thermal conductivity.

The silicone composition of the instant invention is particularly useful for filling the gap between a heat sink and an electronic device or for attaching a heat sink to an electronic device. The silicone composition can also be used for encapsulating the wire windings in power transformers and converters.

These and other features, aspects, and advantages of the present invention will become better understood with reference to the following description and appended claims.

DETAILED DESCRIPTION OF THE INVENTION

The silicone composition of the present invention is "thixotropic" or has "thixotropy", meaning that the composition exhibits a reduction in viscosity when a shearing action is applied and an increase in viscosity upon subsequent rest.

As used herein, the term "thixotropy index" is defined as the ratio of the viscosity of the silicone composition at a shear rate of 0.01 rad/s to the viscosity of the composition at a shear rate of 0.1 rad/s, wherein each viscosity is measured at 23±2° C.

The present invention is directed to a silicone composition for preparing a cured silicone product, the composition comprising:

(A) an organopolysiloxane containing an average of at least two silicon-bonded alkenyl groups per molecule;

(B) an organohydrogenpolysiloxane containing an average of at least two silicon-bonded hydrogen atoms per molecule in a concentration sufficient to cure the composition;

(C) an alumina filler in a concentration sufficient to impart thermal conductivity to the cured silicone product;

(D) an effective amount of a polyether; and (E) a catalytic amount of a hydrosilylation catalyst.

Component (A), also referred to herein as the "polymer," is at least one organopolysiloxane containing an average of at least two silicon-bonded alkenyl groups per molecule. The organopolysiloxane can have a linear, branched, or resinous structure. The organopolysiloxane can be a homopolymer or a copolymer. The alkenyl groups typically have from 2 to about 10 carbon atoms and are exemplified by, but not limited to, vinyl, allyl, butenyl, and hexenyl. The alkenyl groups in the organopolysiloxane may be located at terminal, pendant, or both terminal and pendant positions. The remaining silicon-bonded organic groups in the organopolysiloxane are independently selected from monovalent hydrocarbon and monovalent halogenated hydrocarbon groups free of aliphatic unsaturation. These monovalent groups typically have from 1 to about 20 carbon atoms, preferably have from 1 to 10 carbon atoms, and are exemplified by, but not limited to alkyl such as methyl, ethyl, propyl, pentyl, octyl, undecyl, and octadecyl; cycloalkyl such as cyclohexyl; aryl such as phenyl, tolyl, xylyl, benzyl, and 2-phenylethyl; and halogenated hydrocarbon groups such as 3,3,3-trifluoropropyl, 3-chloropropyl, and dichlorophenyl. Preferably, at least 50 percent, and more preferably at least 80%, of the organic groups free of aliphatic unsaturation in the organopolysiloxane are methyl.

The viscosity of the organopolysiloxane at 25° C., which varies with molecular weight and structure, is typically from 0.005 to 100 Pa·s, preferably from 0.05 to 50 Pa·s, and more preferably from 0.05 to 5 Pa·s.

A preferred organopolysiloxane according to the present invention is a polydiorganosiloxane having the formula $R^2R^1_2SiO(R^1_2SiO)_aSiR^1_2R^2$ wherein each $R^1$ is independently selected from monovalent hydrocarbon and monovalent halogenated hydrocarbon groups free of aliphatic unsaturation, as defined above; $R^2$ is alkenyl, as defined above; and subscript a has a value such that the viscosity of the polydiorganosiloxane at 25° C. is from 0.005 to 100 Pa·s. Preferably, $R^1$ is methyl and $R^2$ is vinyl.

Examples of organopolysiloxanes useful in the silicone composition include, but are not limited to, polydiorganosiloxanes having the following formulae: $ViMe_2SiO(Me_2SiO)_a SiMe_2Vi$, $ViMe_2SiO(Me_2SiO)_{0.25a}(MePhSiO)_{0.75a}SiMe_2Vi$, $ViMe_2SiO(Me_2SiO)_{0.95a}(Ph_2SiO)_{0.05a}SiMe_2Vi$, $ViMe_2SiO(Me_2SiO)_{0.98a}(MeViSiO)_{0.02a}SiMe_2Vi$, $Me_3SiO(Me_2SiO)_{0.95a}(MeViSiO)_{0.05a}SiMe_3$, and $PhMeViSiO(Me_2SiO)_aSiPhMeVi$, where Me, Vi, and Ph denote methyl, vinyl, and phenyl respectively and subscript a is as defined above.

Methods of preparing polydiorganosiloxanes suitable for use in the silicone composition, such as hydrolysis and condensation of the corresponding organohalosilanes or equilibration of cyclic polydiorganosiloxanes, are well known in the art.

Organopolysiloxanes useful in the silicone composition also include an organopolysiloxane resin consisting essentially of $R^3_3SiO_{1/2}$ units (M units) and $SiO_{4/2}$ units (Q units), wherein each $R^3$ is independently selected from monovalent hydrocarbon and monovalent halogenated hydrocarbon groups and the mole ratio of $R^3_3SiO_{1/2}$ units to $SiO_{4/2}$ units in the resin is from 0.6 to 1.9. The monovalent groups represented by $R^3$ typically have from 1 to about 20 carbon atoms and preferably have from 1 to about 10 carbon atoms. Examples of monovalent groups include, but are not limited to, alkyl such as methyl, ethyl, propyl, pentyl, octyl, undecyl, and octadecyl; cycloalkyl such as cylcohexyl; alkenyl such as vinyl, allyl, butenyl, and hexenyl; aryl such as phenyl, tolyl, xylyl, benzyl, and 2-phenylethyl; and halogenated hydrocarbon groups such as 3,3,3-trifluoropropyl, 3-chloropropyl, and dichlorophenyl. Preferably, at least one-third, and more preferably, substantially all $R^3$ groups in the organopolysiloxane resin are methyl.

Preferably, the organopolysiloxane resin contains an average of from about 3 to 30 mole percent of alkenyl groups. The mole percent of alkenyl groups in the resin is defined here as the ratio of the number of moles of alkenyl-containing siloxane units in the resin to the total number of moles of siloxane units in the resin, multiplied by 100.

A specific example of an organopolysiloxane resin is an MQ resin consisting essentially of $CH_2=CH(CH_3)_2SiO_{1/2}$ units, $(CH_3)_3SiO_{1/2}$ units, and $SiO_{4/2}$ unit, wherein the mole ratio of $CH_2=CH(CH_3)_2SiO_{1/2}$ units and $(CH_3)_3SiO_{1/2}$ units combined to $SiO_{4/2}$ units is about 0.7.

The organopolysiloxane resin can be prepared by methods well-known in the art. Preferably, the resin is prepared by treating a resin copolymer produced by the silica hydrosol capping process of Daudt et al. with at least an alkenyl-containing endblocking reagent. The method of Daudt et al, is disclosed in U.S. Pat. No. 2,676,182, which is hereby incorporated by reference to teach how to make organopolysiloxane resins suitable for use in the silicone composition.

Briefly stated, the method of Daudt et al. involves reacting a silica hydrosol under acidic conditions with a hydrolyzable triorganosilane such as trimethylchlorosilane, a siloxane such as hexamethyldisiloxane, or mixtures thereof, and recovering a copolymer having M and Q units. The resulting copolymers generally contain from about 2 to about 5 percent by weight of hydroxyl groups.

The organopolysiloxane resin, which typically contains less than 2 percent by weight of silicon-bonded hydroxyl groups, can be prepared by reacting the product of Daudt et al. with an alkenyl-containing endblocking agent or a mixture of an alkenyl-containing endblocking agent and an endblocking agent free of aliphatic unsaturation in an amount sufficient to provide from 3 to 30 mole percent of alkenyl groups in the final product. Examples of endblocking agents include, but are not limited to, silazanes, siloxanes, and silanes. Suitable endblocking agents are known in the art and exemplified in U.S. Pat. No. 4,584,355 to Blizzard et al.; U.S. Pat No. 4,591,622 to Blizzard et al.; and U.S. Pat. No. 4,585,836 to Homan et al.; which are hereby incorporated by reference. A single endblocking agent or a mixture of such agents can be used to prepare the organopolysiloxane resin.

Component (A) can be a single organopolysiloxane or a mixture comprising two or more organopolysiloxanes that differ in at least one of the following properties: structure, viscosity, average molecular weight, siloxane units, and sequence.

Component (B), also referred to herein as the "crosslinking agent," is at least one organohydrogenpolysiloxane containing an average of at least two silicon-bonded hydrogen atoms per molecule. It is generally understood that crosslinking occurs when the sum of the average number of alkenyl groups per molecule in component (A) and the average number of silicon-bonded hydrogen atoms per molecule in component (B) is greater than four. The silicon-bonded hydrogen atoms in the organohydrogenpolysiloxane can be located at terminal, pendant, or at both terminal and pendant positions.

The organohydrogenpolysiloxane can be a homopolymer or a copolymer. The structure of the organohydrogenpolysiloxane can be linear, branched, cyclic, or resinous. Examples of siloxane units that may be present in the organohydrogenpolysiloxane include, but are not limited to, $HR^4_2SiO_{1/2}$, $R^4_3SiO_{1/2}$, $HR^4SiO_{2/2}$, $R^4_2SiO_{2/2}$, $R^4SiO_{3/2}$, and $SiO_{4/2}$ units. In the preceding formulae each $R^4$ is independently selected from monovalent hydrocarbon and monovalent halogenated hydrocarbon groups free of aliphatic unsaturation, as defined and exemplified above for component (A). Preferably, at least 50 percent of the organic groups in the organohydrogenpolysiloxane are methyl.

Examples of organohydrogenpolysiloxanes include, but are not limited to, a trimethylsiloxy-terminated poly(methylhydrogensiloxane), a trimethylsiloxy-terminated poly(dimethylsiloxane/methylhydrogensiloxane), a dimethylhydrogensiloxy-terminated poly(methylhydrogensiloxane), a dimethylhydrogensiloxy-terminated polydimethylsiloxane, and a resin consisting essentially of $H(CH_3)_2SiO_{1/2}$ units and $SiO_{4/2}$ units.

Component (B) can be a single organohydrogenpolysiloxane or a mixture comprising two or more organohydrogenpolysiloxanes that differ in at least one of the following properties: structure, average molecular weight, viscosity, siloxane units, and sequence.

The concentration of component (B) in the silicone composition is sufficient to cure (crosslink) the composition. The exact amount of component (B) depends on the desired extent of cure, which generally increases as the ratio of the number of moles of silicon-bonded hydrogen atoms in component (B) to the number of moles of alkenyl groups in component (A) increases. Typically, the concentration of component (B) is sufficient to provide from 0.3 to 5 silicon-bonded hydrogen atoms per alkenyl group in component (A). Preferably, the concentration of component (B) is sufficient to provide from 0.3 to 2 silicon-bonded hydrogen atoms per alkenyl group in component (A).

Methods of preparing linear, branched, and cyclic organohydrogenpolysiloxanes, such as hydrolysis and condensation of organohalosilanes, are well-known in the art. Methods of preparing organohydrogenpolysiloxane resins are also well-known as exemplified in U.S. Pat. Nos. 5,310,843; 4,370,358; and 4,707,531.

To ensure compatibility of components (A) and (B), the predominant organic group in each component is preferably the same. Preferably, this group is methyl.

Component (C) is an alumina (aluminum oxide) filler. The alumina filler comprises alumina particles having an average size typically from 0.2 to 150 μm and preferably from 0.2 to 20 μm. Preferably, the alumina filler comprises calcined alumina, $\alpha$-$Al_2O_3$. The alumina filler can be a treated alumina filler, prepared by treating the surfaces of alumina particles with an organosilicon compound. The organosilicon compound can be any of the organosilicon compounds typically used to treat silica fillers. Examples of organosilicon compounds include, but are not limited to, organochlorosilanes such as methyltrichlorosilane, dimethyldichlorosilane, and trimethyl monochlorosilane; organosiloxanes such as hydroxy-endblocked dimethylsiloxane oligomer, hexamethyldisiloxane, and tetramethyldivinyldisiloxane; organosilazanes such as hexamethyldisilazane, hexamethylcyclotrisilazane; and organoalkoxysilanes such as methyltrimethoxysilane, vinyltrimethoxysilane, vinyltriethoxysilane, 3-glycidoxypropyltrimethoxysilane, and 3-methacryloxypropyltrimethoxysilane.

Although the shape of the alumina particles is not critical, particles having a spherical shape are preferred because they generally impart a smaller increase in viscosity to the silicone composition than particles having other shapes.

Component (C) can be a single alumina filler as described above or a mixture of two or more such fillers that differ in at least one of the following properties: surface area, surface treatment, particle size, density, and particle shape.

The concentration of component (C) in the silicone composition of the present invention is sufficient to impart thermal conductivity to the silicone product formed by curing the composition. The concentration of component (C) is such that the cured silicone product has a thermal conductivity typically of at least 0.8 W/mK and preferably of at least 1.5 W/mK, as determined using the method in the Examples below. The exact concentration of component (C) depends on the desired thermal properties, surface area of the filler, density of the filler, shape of the filler particles, surface treatment of the filler, and nature of the other components in the silicone composition. The concentration of component (C) is typically from about 60 to about 90 percent by weight and preferably from about 70 to about 85 percent by weight, based on the total weight of the silicone composition. When the concentration of component (C) is less than about 60 percent by weight, the cured silicone product does not have significant thermal conductivity. When the concentration of component (C) is greater than about 90 percent by weight, the silicone composition has a very high viscosity and cures to form a brittle product.

Methods of preparing alumina fillers suitable for use in the silicone composition of the present invention are well-known in the art; many of these fillers are commercially available.

As stated above, the alumina filler of the present invention can be an alumina filler prepared by treating the surfaces of alumina particles with at least one organosilicon compound. In this case, the particles can be treated prior to admixture with the other ingredients of the silicone composition or the particles can be treated in situ during the preparation of the silicone composition.

Component (D) is at least one polyether. The polyether can be an oligomer, a homopolymer, or a copolymer, such as a block copolymer or graft copolymer. Further, the structure of the polyether can be linear, branched, or cyclic. Preferably, the polyether is a polyoxyalkylene or a polyorganosiloxane-polyoxyalkylene copolymer.

Examples of polyoxyalkylenes include, but are not limited to, a poly(oxyethylene) having the general formula $R^5O(CH_2CH_2O)_bR^5$, a poly(oxypropylene) having the general formula $R^5O[CH_2CH(CH_3)O]_bR^5$, a poly(oxybutylene) having the general formula $R^5O(CH_2CH(CH_2CH_3)O)_bR^5$, and a poly(oxyethylene-oxypropylene) copolymer having the formula $R^5O(CH_2CH_2O—)_c[CH_2CH(CH_3)O]_dR^5$, wherein each $R^5$ is independently hydrogen, $R^6$, or —C(=O)—$R^6$, wherein $R^6$ is a monovalent hydrocarbon or monovalent halogenated hydrocarbon group, and b has a value such that the average molecular weight of the polyoxyalkylene is from about 1000 to about 35,000, and c+d=b; and cyclic polyoxyalkylenes.

The monovalent groups represented by $R^6$ typically have from 1 to about 20 carbon atoms and preferably have from 1 to about 10 carbon atoms. Examples of monovalent groups include, but are not limited to, alkyl such as methyl, ethyl, propyl, pentyl, octyl, undecyl, and octadecyl; cycloalkyl such as cylcohexyl; alkenyl such as vinyl, allyl, butenyl, and hexenyl; aryl such as phenyl, tolyl, xylyl, benzyl, and 2-phenylethyl; and halogenated hydrocarbon groups such as 3,3,3-trifluoropropyl, 3-chloropropyl, and dichlorophenyl.

Specific examples of polyoxyalkylenes include, but are not limited to, poly(ethylene glycol), poly(propylene glycol), poly(tetrahydrofuran), and ether and ester derivatives thereof, such as monomethyl ether, dimethyl ether, and diacetate; the series of poly(oxyethylene) sorbitan esters under the trademark Tween sold by I.C.I. America; and the series of nonylphenyl poly(ethylene glycol) ethers sold under the trade mark TERGITOL NP by Union Carbide.

Polyorganosiloxane-polyoxyalkylene copolymers, also referred to as "silicone polyethers" in the art, typically have a polysiloxane backbone and pendant and/or terminal polyether groups. However, the silicone polyether copolymer can have an "inverted" structure, wherein the copolymer has a polyether backbone and pendant and/or terminal polysiloxane groups. The polysiloxane and polyether groups in the silicone polyether can have a branched or unbranched structure.

The polyorganosiloxane-polyoxyalkylene copolymer can be a "hydrolyzable" or "non-hydrolyzable". In hydrolyzable polyorganosiloxane-polyoxyalkylenes, the polyether groups are attached to the silicone via hydrolytically unstable silicon-oxygen-carbon (Si—OC) linkages. In non-hydrolyzable polyorganosiloxane-polyoxyalkylenes, the polyether groups are attached to the silicone via hydrolytically stable silicon-carbon (Si—C) bonds.

The polyoxyalkylene groups in the polyorganosiloxane-polyoxyalkylene typically contain oxyalkylene units such as oxyethylene units (—$CH_2CH_2O$—), oxypropylene units (—$CH_2CH(CH_3)O$—), and oxybutylene units, (—$CH_2CH(CH_2CH_3)O$—). The polyoxyalkylene groups can contain a single type of oxyalkylene unit or a combination of two or more different units, for example, oxyethylene units and oxypropylene units.

According to a preferred embodiment of the present invention, a polyorganosiloxane-polyoxyalkylene copolymer has the general formula:

$$R^8R^7_2SiO(R^7_2SiO)_e(R^9R^7SiO)_fSiR^7_2R^8$$

wherein each $R^7$ is a monovalent hydrocarbon group, $R^8$ is $R^7$ or $R^9$, $R^9$ is a polyoxyalkylene group having a general formula selected from:

$$-R^{10}(OCH_2CH_2)_gOR^{11}$$

and $$-R^{10}(OCH_2CH_2)_h(OCH_2CH(CH_3))_iOR^{11}$$

wherein $R^{10}$ is a divalent hydrocarbon group having from 2 to 20 carbon atoms; $R^{11}$ is selected from hydrogen, alkyl groups having 1 to 4 carbon atoms and acyl groups having from 2 to 6 carbon atoms; e has a value of from 8 to 250, f has a value of from 4 to 50, g has a value of from 5 to 60, h+i=g, and h/i=0.5:1 to 2:1.

Preferably, the monovalent hydrocarbon groups represented by $R^7$ have from 1 to 12 carbon atoms. Examples of monovalent hydrocarbon groups represented by $R^7$ include, but are not limited to, alkyl, such as methyl, ethyl, propyl, butyl, and octyl; cycloalkyl, such as cyclopentyl and cylohexyl; alkenyl such as vinyl, allyl, butenyl, and hexenyl; and aryl such as phenyl, naphthyl, benzyl, and tolyl. Preferably, the monovalent hydrocarbon groups represented by $R^7$ are all methyl, based on the availability of starting materials.

Preferably, the divalent hydrocarbon groups represented by $R^{10}$ have from 3 to 6 carbon atoms. Examples of divalent hydrocarbon groups represented by $R^{10}$ include, but are not limited to, groups having the formulae: —$CH_2CH_2CH_2$—, —$CH_2CH_2CH_2CH_2$—, —$CH_2CH(CH_3)$—, —$CH_2CH(CH_3)CH_2$—, and —$CH_2CH_2CH_2CH_2CH_2$—. Preferably, the divalent hydrocarbon group represented by $R^{10}$ has the formula —$CH_2CH_2CH_2$—.

Specific examples of polyorganosiloxane-polyoxyalkylene copolymers are provided in the Examples section below.

Methods of preparing polyorganosiloxane-polyoxyalkylene copolymers are well-known in the art, as exemplified in U.S Pat. No. 4,122,029. For example, a polyorganosiloxane-polyoxyalkylene copolymer can be prepared using a hydrosilylation reaction by reacting a polydiorganosiloxane containing silicon-bonded hydrogen atoms with a polyoxyalkylene containing aliphatic unsaturation in the presence of a platinum group catalyst.

Alternatively, a polyorganosiloxane-polyoxyalkylene copolymer can be prepared using a nucleophilic displacement reaction by reacting, for example, a polydiorganosiloxane containing silicon-bonded haloalkyl groups, such as —$CH_2Cl$, with a polyoxyalkylene containing hydroxyl groups in the presence of a hydrogen halide scavenger.

A polyorganosiloxane-polyoxyalkylene copolymer can also be prepared using a condensation reaction by reacting, for example, a polydiorganosiloxane containing silicon-bonded hydrolyzable groups with a polyoxyalkylene containing hydroxyl groups. Examples of hydrolyzable groups include, but are not limited to, hydrogen; hydroxy; alkoxy, such as methoxy, ethoxy, and isopropoxy; halo, such as fluoro, chloro, bromo, and iodo; amido, such as N-methylacetamido; oximo, such as methylethylketoximo; aminoxy, such as diethylaminoxy; and acyloxy, such as acetoxy and propionoxy.

Component (D) is present in an effective amount in the silicone composition. As used herein, the term "effective amount" means that the concentration of component (D) is such that the silicone composition has improved thixotropy compared with a similar silicone composition lacking only the polyether. Typically, the concentration of component (D) is such that the silicone composition exhibits at least about a 25% improvement in thixotropy index, as determined using the method in the Examples below. The concentration of component (D) is typically from about 0.05 to about 2 percent by weight and preferably from about 0.1 to about 1 percent by weight, based on the total weight of the composition. When the concentration of component (D) is less than about 0.05 percent by weight, the silicone composition typically does not exhibit improved thixotropy. When the concentration of component (D) is greater than about 2 percent by weight, there is little additional improvement in thixotropy. The effective amount of component (D) can be determined by routine experimentation using the methods in the Examples below.

Component (E) is a hydrosilylation catalyst that promotes the addition reaction of component (A) with component (B). The hydrosilylation catalyst can be any of the well-known hydrosilylation catalysts comprising a platinum group metal, a compound containing a platinum group metal, or a microencapsulated platinum group metal-containing catalyst. Platinum group metals include platinum, rhodium, ruthenium, palladium, osmium and iridium. Preferably, the platinum group metal is platinum, based on its high activity in hydrosilylation reactions.

Preferred hydrosilylation catalysts include the complexes of chloroplatinic acid and certain vinyl-containing organosiloxanes disclosed by Willing in U.S. Pat. No. 3,419,593, which is hereby incorporated by reference. A preferred catalyst of this type is the reaction product of chloroplatinic acid and 1,3-diethenyl- 1,1,3,3-tetramethyldisiloxane.

The hydrosilylation catalyst can also be a microencapsulated platinum group metal-containing catalyst comprising a platinum group metal encapsulated in a thermoplastic resin. Compositions containing microencapsulated hydrosilylation catalysts are stable for extended periods of time, typically several months or longer, under ambient conditions, yet cure relatively rapidly at temperatures above the melting or softening point of the thermoplastic resin(s).

Microencapsulated hydrosilylation catalysts and methods of preparing them are well-known in the art, as exemplified in U.S. Pat. No. 4,766,176 and the references cited therein; and U.S. Pat. No. 5,017,654.

The concentration of component (E) is sufficient to catalyze the addition reaction of components (A) and (B). Typically, the concentration of component (E) is sufficient to provide from 0.1 to 1000 ppm of a platinum group metal, preferably from 1 to 500 ppm of a platinum group metal, and more preferably from 5 to 150 ppm of a platinum group metal, based on the combined weight of components (A), (B), and (C). The rate of cure is very slow below 0.1 ppm of platinum group metal. The use of more than 1000 ppm of platinum group metal results in no appreciable increase in cure rate, and is therefore uneconomical.

The silicone composition can further comprise at least one hydrosilylation catalyst inhibitor. Mixtures of (A), (B), (C), (D), and (E) may begin to cure at ambient temperature. To obtain a longer working time or "pot life" at room temperature, the activity of the catalyst under ambient conditions can be retarded or suppressed by the addition of a suitable inhibitor to the silicone composition. Suitable inhibitors include various "ene-yne" systems such as 3-methyl-3-penten-1-yne and 3,5-dimethyl-3-hexen-1-yne; acetylenic alcohols such as 3,5-dimethyl-1-hexyn-3-ol, 1-ethynyl-1-cyclohexanol, and 2-phenyl-3-butyn-2-ol; maleates and fumarates, such as the well known dialkyl, dialkenyl, and dialkoxyalkyl fumarates and maleates; and cyclovinylsiloxanes. Acetylenic alcohols constitute a preferred class of inhibitors in the silicone composition.

Typically, the concentration of inhibitor in the present silicone composition is sufficient to provide a "pot life" of at least one hour at room temperature. This concentration will vary widely depending on the particular inhibitor used, the nature and concentration of the hydrosilylation catalyst, and the nature of the organohydrogenpolysiloxane.

Inhibitor concentrations as low as one mole of inhibitor per mole of platinum group metal will in some instances yield a satisfactory storage stability and cure rate. In other instances, inhibitor concentrations of up to 500 or more moles of inhibitor per mole of platinum group metal may be required. The optimum concentration for a particular inhibitor in a given silicone composition can be readily determined by routine experimentation.

The silicone composition can further comprise at least one adhesion promoter that effects strong unprimed adhesion of the silicone composition to substrates commonly employed in the construction of electronic devices; for example, silicon; passivation coatings, such as silicon dioxide and silicon nitride; glass; metals, such as copper and gold; ceramics; and organic resins, such as polyimide and epoxy. The adhesion promoter can be any adhesion promoter typically employed in addition-curable silicone compositions.

Preferred adhesion promoters include an adhesion promoter prepared by mixing at least one polysiloxane having at least one silicon-bonded alkenyl group and at least one silicon-bonded hydroxy group per molecule, and at least one epoxy-functional alkoxysilane. The polysiloxane typically has less than about 15 silicon atoms per molecule and preferably has 3 to about 15 silicon atoms per molecule. The alkenyl groups in the polysiloxane typically have 2 to about 6 carbon atoms. Examples of alkenyl groups include, but are not limited to, vinyl, allyl, and hexenyl. Preferably, the alkenyl group is vinyl. The remaining silicon-bonded organic groups in the polysiloxane are independently selected from alkyl and phenyl. The alkyl groups typically have less than about 7 carbon atoms. Suitable alkyl groups are exemplified by, but not limited to, methyl, ethyl, propyl, and butyl. Preferably, the alkyl group is methyl.

The silicon-bonded hydroxy and silicon-bonded alkenyl groups in the polysiloxane can be located at terminal, pendant, or at both terminal and pendant positions. The polysiloxane can be a homopolymer or a copolymer. The structure of the polysiloxane is typically linear or branched. The siloxane units in the polysiloxane may include $HOR^{12}_2SiO_{1/2}$, $R^{12}(CH_2=CH)SiO_{2/2}$, $R^{12}_2SiO_{2/2}$, $C_6H_5SiO_{3/2}$, $R^{12}(C_6H_5)SiO_{2/2}$, $(C_6H_5)_2SiO_{2/2}$, $(C_6H_5)(CH_2=CH)R^{12}_2SiO_{1/2}$, and $(HO)(C_6H_5)R^{12}SiO_{1/2}$, where $R^{12}$ is an alkyl group having less than about 7 carbon atoms as exemplified above. Preferably, the polysiloxane is a hydroxy-terminated polydiorganosiloxane containing methylvinylsiloxane units. Such polysiloxanes and methods for their preparation are well known in the art.

The epoxy-functional alkoxysilane contains at least one epoxy-functional organic group and at least one silicon-bonded alkoxy group. The structure of the epoxy-functional alkoxysilane is typically linear or branched. The alkoxy groups in the epoxy-functional alkoxysilane typically have less than about 5 carbon atoms and are exemplified by methoxy, ethoxy, propoxy, and butoxy, wherein methoxy is a preferred alkoxy group. Preferably, the epoxy-functional organic group has a formula selected from:

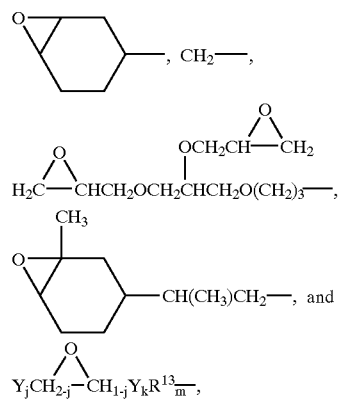

wherein each Y is independently an alkyl group having 1 or 2 carbon atoms; j is 0, 1, or 2; k and m are each 0 or 1; and $R^{13}$ is a divalent hydrocarbon group having no more than 12 carbon atoms. Preferably, $R^{13}$ is selected from a saturated aliphatic hydrocarbon group, an arylene group, and a divalent group having the formula

—$R^{14}(OR^{14})_nOR^{14}$—, wherein $R^{14}$ is a divalent saturated aliphatic hydrocarbon group having 1 to 6 carbon atoms and n has a value of from 0 to 8.

The remaining silicon-bonded organic groups in the epoxy-functional alkoxysilane are independently selected from monovalent hydrocarbon groups having less than 7 carbon atoms and fluorinated alkyl groups having less than about 7 carbon atoms. The monovalent hydrocarbon groups are exemplified by, but not limited to, alkyl, such as methyl, ethyl, propyl, and hexyl; alkenyl, such as vinyl and allyl; and aryl such as phenyl. Examples of suitable fluorinated alkyl groups include, but are not limited to, 3,3,3-trifluoropropyl, β-(perfluoroethyl)ethyl, and β-(perfluoropropyl)ethyl.

Preferably, the epoxy-functional alkoxysilane is a monoepoxytrialkoxysilane. Examples of epoxy-functional alkoxysilanes include 3-glycidoxypropyltrimethoxysilane, 1,2-epoxy-4-(2-trimethoxysilylethyl)cyclohexane, and 1,2-epoxy-2-methyl-4-(1-methyl-2-trimethoxysilylethyl) cyclohexane. Methods for the preparation of such silanes are well known in the art.

The two components of the aforementioned adhesion promoter can be either mixed directly together and added to the silicone composition or added separately to the composition. Typically, the relative amount of the polysiloxane and silane are adjusted to provide about one mole of the silane per mole of silanol groups in the polysiloxane.

The preceding class of adhesion promoters is disclosed in U.S. Pat. No. 4,087,585, which is hereby incorporated by reference to teach adhesion promoters suitable for use in the silicone composition.

Preferably, the polysiloxane and epoxy-functional alkoxysilane are first mixed and then added to the composition. More preferably, the polysiloxane and silane are reacted at an elevated temperature. The organopolysiloxane and the silane can be reacted using well known methods of reacting silanol-containing organosiloxanes with alkoxysilanes. The reaction is typically carried out in the presence of a basic catalyst. Examples of suitable catalysts include, but are not limited to, alkali metal hydroxides, alkali metal alkoxides, and alkali metal silanoates. Preferably, the reaction is carried out using about a 1:1 mole ratio of alkoxy groups in the epoxy-functional alkoxysilane to silicon-bonded hydroxy groups in the polysiloxane. The polysiloxane and silane can be reacted either in the absence of a diluent or in the presence of an inert organic solvent, such as toluene. The reaction is preferably carried out at an elevated temperature, for example, from about 80 to about 150° C.

Preferred adhesion promoters also include at least one organopentasiloxane having the formula:

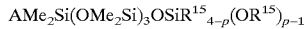

$$AMe_2Si(OMe_2Si)_3OSiR^{15}{}_{4-p}(OR^{15})_{p-1}$$

wherein A is hydrogen or an aliphatically unsaturated monovalent hydrocarbon group, $R^{15}$ is alkyl, and p is an integer from 2 to 4.

Examples of aliphatically unsaturated monovalent hydrocarbon groups represented by A include, but are not limited to, vinyl, allyl, butenyl, hexenyl, and isopropenyl. Preferably A is a hydrogen atom or a vinyl group, based on availability of starting materials and cost. The alkyl groups represented by $R^{15}$ typically have 1 to about 6 carbon atoms and preferably have 1 to 3 carbon atoms. Examples of suitable alkyl groups include, but are not limited to methyl, ethyl, propyl, butyl, pentyl, and hexyl. Alkyl groups containing at least 3 carbon atoms can have a branched or unbranched structure. Preferably, $R^{15}$ is methyl or ethyl, based on availability of starting materials and cost.

The organopentasiloxane can be prepared by first reacting hexamethylcyclotrisiloxane with an organosilane having the formula $AMe_2SiX$ to produce a tetrasiloxane having the formula $AMe_2Si(OMe_2Si)_3X$ where A is defined above and X is a halogen. The tetrasiloxane is then hydrolyzed to produce an alpha-hydroxytetrasiloxane having the formula $AMe_2Si(OMe_2Si)_3OH$ wherein A is defined above. The alpha-hydroxytetrasiloxane is reacted with an organosiloxane having the formula $R^{15}{}_{4-p}Si(OR_{15})_p$ wherein $R^{15}$ and p are defined above.

A specific example of an organopentasiloxane is 1-vinyl-9,9,9-trimethoxyoctamethylpentasiloxane, having the formula $ViMe_2SiO(Me_2SiO)_3Si(OMe)_3$ where Vi is vinyl and Me is methyl. This organopentasiloxane is particularly preferred in silicone compositions comprising a microencapsulated hydrosilylation catalyst. Importantly, the organopentasiloxane does not cause dissolution of the silicone resin in the microencapsulated catalyst under ambient conditions. Also, the aforementioned organopentasiloxane exhibits superior adhesion to metals commonly used in the fabrication of electronic devices.

The preceding class of adhesion promoters is disclosed in U.S. Pat. No. 5,194,649, which is hereby incorporated by reference to teach adhesion promoters suitable for use in the silicone composition.

The concentration of the adhesion promoter in the silicone composition is sufficient to effect adhesion of the composition to a substrate, such as those cited above. The concentration can vary over a wide range depending on the nature of the adhesion promoter, the type of substrate, and the desired adhesive bond strength. The concentration of the adhesion promoter is generally from 0.01 to about 10 percent by weight, based on the total weight composition. However, the optimum concentration of the adhesion promoter can be readily determined by routine experimentation.

The silicone composition can be a one-part composition comprising components (A) through (E) in a single part or, alternatively, a multi-part composition comprising components (A) through (E) in two or more parts, provided components (A), (B), and (E) are not present in the same part. For example, a multi-part silicone composition can comprise a first part containing a portion of component (A), a portion of component (C), a portion of component (D), and all of component (E) and a second part containing the remaining portions of components (A), (C), and (D) and all of component (B).

The one-part silicone composition is typically prepared by combining components (A) through (E) and any optional ingredients in the stated proportions at ambient temperature with or without the aid of an organic solvent. Although the order of addition of the various components is not critical if the silicone composition is to be used immediately, the hydrosilylation catalyst is preferably added last at a temperature below about 30° C. to prevent premature curing of the composition. Also, the multi-part silicone composition can be prepared by combining the particular components designated for each part.

Mixing can be accomplished by any of the techniques known in the art such as milling, blending, and stirring, either in a batch or continuous process. The particular device is determined by the viscosity of the components and the viscosity of the final silicone composition.

The silicone composition can be applied to a wide variety of solid substrates including, but not limited to, metals such as aluminum, gold, silver, tin-lead, nickel, copper, and iron, and their alloys; silicon; fluorocarbon polymers such as polytetrafluoroethylene and polyvinylfluoride; polyamides such as Nylon; polyimides; epoxies; polyesters; ceramics; and glass. Furthermore, the silicone composition of the instant invention can be applied to a substrate by any suitable means such as spraying, syringe dispensing, screen or stencil printing, or ink jet printing.

A cured silicone product according to the present invention comprises a reaction product of the silicone composition containing components (A) through (E), described above. The silicone composition can be cured at a temperature from about room temperature to about 200° C., preferably from about 80 to about 180° C., and more preferably from about 100 to about 150° C., for a suitable length of time. For example, the silicone composition cures in less than about 24 hours at room temperature and in less than about one hour at 100° C.

The silicone composition of the present invention has numerous advantages, including adjustable thixotropy, low VOC (volatile organic compound) content, and adjustable cure. Moreover, the present silicone composition cures to form a silicone product having good thermal conductivity.

The thixotropy of the present silicone composition can be conveniently adjusted by proper selection of the type and amount of polyether. Due to its thixotropy, the silicone composition can be applied to a variety of substrates using conventional equipment. In particular, the silicone composition of the present invention can be applied using the method of stencil printing. Moreover, once applied, the silicone composition exhibits excellent dimensional stability, tending not to sag or flow.

Also, the silicone composition of the present invention, which does not require an organic solvent for many applications, has a very low VOC content. Consequently, the present silicone composition avoids the health, safety, and environmental hazards associated with solvent-borne silicone compositions. In addition, the solventless composition of the present invention typically undergoes less shrinkage during curing than solvent-borne silicone compositions.

Additionally, the silicone composition of the present invention cures rapidly at temperatures from room temperature to moderately elevated temperatures without the formation of detectable byproducts. In fact, the cure rate of the silicone composition can be conveniently adjusted by regulating the concentration of catalyst and/or optional inhibitor.

The silicone composition of the instant invention is particularly useful for filling the gap between a heat sink and an electronic device or for attaching a heat sink to an electronic device. The silicone composition can also be used for encapsulating the wire windings in power transformers and converters.

EXAMPLES

The following examples are presented to further illustrate the silicone composition of this invention, but are not to be considered as limiting the invention, which is delineated in the appended claims. Unless otherwise noted, all parts and percentages reported in the examples are by weight. The following methods and materials were employed in the examples:

The thixotropy index and viscosity of a silicone composition were determined using a Rheometrics ARES SLCII parallel plate rheometer equipped with 25 mm plates. The pre-programmed thixotropic loop test was operated in strain controlled mode with shear rate increasing from 0.0 to 10.0 rad/s at 23±2° C. The reported thixotropy index is the ratio of the viscosity of the silicone composition at a shear rate of 0.01 rad/s to the viscosity of the composition at a shear rate of 0.1 rad/s. The reported viscosity is at a shear rate of 1.0 rad/s.

Cured silicone test samples for thermal conductivity and durometer measurements were prepared as follows: The silicone composition was poured into an aluminum weigh pan and then cured at 100° C. for one hour. A disk-shaped sample having a diameter of about 2.5 cm and a thickness of about 1.6 cm was removed from the sample using a punch.

The thermal conductivity of a cured silicone product was determined using a Mathis Hot Disk Thermal Analyzer. This measurement is based on a transient plane technique with a line frequency of 60 Hz, a power of 0.25 watts for 5 seconds, and a 3.3 mm probe. The reported value for thermal conductivity is reported in units of Watts per meter Kelvin (W/mK).

The durometer of a cured silicone product was determined using a Shore 00 instrument. The reported value for durometer is the median of five measurements made at different locations on the same sample.

Polymer A: a dimethylvinylsiloxy-terminated polydimethylsiloxane having a viscosity of about 0.45 Pa·s at 25° C.

Polymer B: a dimethylvinylsiloxy-terminated polydimethylsiloxane having a viscosity of about 0.065 Pa·s at 25° C.

Crosslinking Agent: trimethylsiloxy-terminated poly (dimethylsiloxane/methylhydrogensiloxane) having an average of 3 dimethylsiloxane units and 5 methylhydrogensiloxane units per molecule and containing about 0.8% of silicon-bonded hydrogen atoms.

Filler A: a calcined milled alumina having an average particle size of 14 μm, which is sold under the name RMA325 by Alcan Chemicals Europe (Fife, Scotland).

Filler B: a dispersible calcined alumina having an average particle size of 0.4 μm, which is sold under the name A-1000 SGD by Alcoa (Bauxite, Ark.).

Inhibitor: 3,5-dimethyl-1-hexyn-3-ol.

Catalyst: a mixture consisting of 1% of a platinum(IV) complex of 1,1-diethenyl-1,1,3,3-tetramethyldisiloxane, 92% of Polymer A, and 7% of tetramethyldivinyldisiloxane.

Pigment: a mixture consisting of 6% carbon black, 82% of Polymer A, and 12% zinc oxide.

Silicone Base A: A silicone base was prepared by first mixing 0.98 part of methyltimethoxysilane, 7.59 parts of Polymer A, and 7.59 parts of Polymer B in a Baker Perkins sigma blade mixer for 5 minutes. Filler A (50.08 parts) and 33.28 parts of Filler B were added successively to the mixture in small portions. The mixture was then heated at 150° C. under vacuum (10 kPa) for 1 to 2 hours to remove volatile materials. After cooling the mixture to room temperature, 0.35 part of Catalyst and 0.13 part of Pigment were added to the mixture.

Silicone Base B: A silicone base was prepared by first mixing 0.98 part of methyltimethoxysilane, 7.59 parts of Polymer A, and 7.59 parts of Polymer B in a Baker Perkins sigma blade mixer for 5 minutes. Filler A (50.07 parts) and 33.28 parts of Filler B were added successively to the mixture in small portions. The mixture was then heated at 150° C. under vacuum (10 kPa) for 1 to 2 hours to remove volatile materials. After cooling the mixture to room temperature, 0.35 part of Catalyst, 0.13 part of Pigment, and 0.01 part of Inhibitor were added to the mixture.

Surfactant A: a silicone polyether surfactant having a viscosity of 1700 mm²/s at 25° C., which is sold under the names DC198 Surfactant and DABCO DC198 surfactant by Dow Corning Corporation (Midland, Mich.) and Air Products (Allentown, Pa.), respectively. The surfactant comprises a silicone polyether copolymer having a weight-average molecular weight of 26,786 and the average formula:

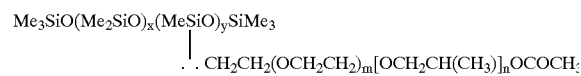

where the average values of x, y, m, and n are 108, 10, 18, and 18, respectively.

Surfactant B: a silicone polyether surfactant having a viscosity of 2,000 mm₂/s at 25° C., which is sold under the names DC5247 Surfactant and DABCO DC5247 Surfactant by Dow Corning Corporation (Midland, Mich.) and Air Products (Allentown, Pa.), respectively. The surfactant comprises a silicone polyether copolymer having a weight average molecular weight of 26,347 and the average formula:

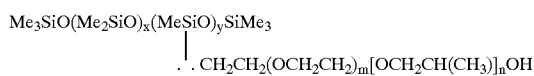

where the average values of x, y, m, and n are 108, 10, 18, and 18, respectively.

Surfactant C: a silicone polyether surfactant having a viscosity of 875 mm₂/s at 25° C., which is sold under the names DC5125 Surfactant and DABCO DC5125 by Dow Corning Corporation (Midland, Mich.) and Air Products (Allentown, Pa.), respectively. The surfactant comprises a silicone polyether copolymer having a weight average molecular weight of 43,402 and the average formula:

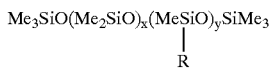

where each R is independently a polyether group having the formula:

$$—(CH_2)_3(OCH_2CH_2)_m[OCH_2CH(CH_3)]_nOCOCH_3 \quad (a)$$

or $$—(CH_2)_3(OCH_2CH_2)_oOCOCH_3 \quad (b)$$

where the average values of x, y, m, n, and o are 169, 23, 18, 18, and 12, respectively.

Surfactant D: a silicone polyether surfactant having a viscosity of 1845 m²/s at 25° C., which is sold under the name DABCO DC5950 Surfactant by Air Products (Allentown, Pa.). The surfactant comprises a silicone polyether copolymer having the average formula:

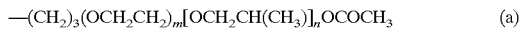

where each R is independently a polyether group having the formula:

$$—(CH_2)_3(OCH_2CH_2)_m[OCH_2CH(CH_3)]_nOCOCH_3 \quad (a)$$

or $$—(CH_2)_3(OCH_2CH_2)_o[OCH_2CH(CH_3)]_pOCOCH_3 \quad (b)$$

where the average values of x, y, m, n, o, and p are 60.4, 7.6, 30, 30, 12, and 12, respectively.

Surfactant E: a silicone polyether surfactant having a viscosity of 650 mm²/s at 25° C., which is sold under the names DC5188 Surfactant and DABCO DC5188 Surfactant by Dow Corning Corporation (Midland, Mich.) and Air Products (Allentown, Pa.), respectively. The surfactant comprises a silicone polyether copolymer having the average formula:

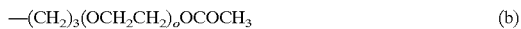

where the average values of x, y, m, and n are 93, 6, 21, and 21, respectively.

Surfactant F: silicone polyether surfactant having a viscosity of 425 mm²/s at 25° C., which is sold under the names DC193Surfactant and DABCO DC 193 surfactant by Dow Corning Corporation (Midland, Mich.) and Air Products (Allentown, Pa.), respectively. The surfactant comprises a silicone polyether copolymer having a weight average molecular weight of 3,129 and the average formula:

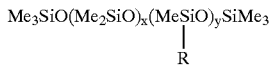

where the average values of x, y, and m are 8.7, 3.7, and 12, respectively.

Comparative Example 1

A silicone composition was prepared by first combining 99.98 parts of Silicone Base A and 0.02 part of Inhibitor. The mixture was blended for 25 s using an AM 501 Hauschild dental mixer set at high speed and then for 60 s by hand using a spatula. The viscosity and thixotropy index of the composition are shown in Table 1.

Examples 1a–i

In Examples 1a–i, Surfactant A was added in successive portions to the silicone composition of Comparative Example 1 to produce a series of compositions having the surfactant concentrations shown in Table 1. After each addition, the mixture was blended for 25 s using an AM-501 Hauschild dental mixer set at high speed and then for 60 s by hand using a spatula. The viscosity and thixotropy index of each composition are shown in Table 1.

Example 2

A silicone composition was prepared by first combining 99.84 parts of Silicone Base A and 0.01 part of Inhibitor, and 0.15 part of Surfactant B. The mixture was blended for 25 s using an AM 510 Hauschild dental mixer set at high speed and then for 60 s by hand using a spatula. The viscosity and thixotropy index of the composition are shown in Table 1.

Examples 3a–b

In Example 3a, a silicone composition was prepared by first combining 99.87 parts of Base A, 0.01 part of Inhibitor, and 0.11 part of Surfactant C. The mixture was blended for 25 s using an AM 501 Hauschild dental mixer set at high speed and then for 60 s by hand using a spatula.

In Example 3b, 0.14 part of Surfactant C was added to the silicone composition of Example 3a. The mixture was then blended as described above. The viscosity and thixotropy index of each composition are shown in Table 1.

Example 4

A silicone composition was prepared by first combining 99.83 parts of Base A, 0.01 part of Inhibitor, and 0.16 part of Surfactant D. The mixture was blended for 25 s using an AM 501 Hauschild dental mixer set at high speed and then for 60 s by hand using a spatula. The viscosity and thixotropy index of the composition are shown in Table 1.

Examples 5a–b

In Example 5a, a silicone composition was prepared by first combining 99.75 parts of Base A, 0.01 part of Inhibitor, and 0.23 part of Surfactant E. The mixture was blended for 25 s using an AM 501 Hauschild dental mixer set at high speed and then for 60 s by hand using a spatula.

In Example 5b, 0.21 part of Surfactant E was added to the silicone composition of Example 3a. The mixture was then blended as described above. The viscosity and thixotropy index of each composition are shown in Table 1.

Example 6

A silicone composition was prepared by first combining 99.85 parts of Base A, 0.01 part of Inhibitor, and 0.14 part of Surfactant F. The mixture was blended for 25 s using an AM 501 Hauschild dental mixer set at high speed and then for 60 s by hand using a spatula. The viscosity and thixotropy index of the composition are shown in Table 1.

Comparative Example 2

A silicone composition was prepared by first combining 99.42 parts of Silicone Base B and 0.28 part of Crosslinking Agent. The mixture was blended for 25 s using an AM 501 Hauschild dental mixer set at high speed and then for 60 s by hand using a spatula. The viscosity and thixotropy index of the composition are shown in Table 1.

Example 7

A silicone composition was prepared by combining 99.42 parts of Silicone Base B, 0.28 part of Crosslinking Agent, and 0.30 part of Surfactant A. The mixture was blended for 25 s using an AM 501 Hauschild dental mixer set at high speed and then for 60 s by hand using a spatula. The viscosity and thixotropy index of the composition are shown in Table 1.

TABLE 1

| Example | Silicone Polyether Copolymer | Wt % | Viscosity (Pa · s) | Thixotropy Index |
|---|---|---|---|---|
| Comp. 1 | — | — | 20.2 | 2.4 |
| 1a | A | 0.02 | 36.6 | 2.0 |
| 1b | A | 0.07 | 264.3 | 3.5 |
| 1c | A | 0.11 | 564.9 | 7.7 |
| 1d | A | 0.2 | 767.6 | 9.5 |
| 1e | A | 0.3 | 1371.6 | 12.5 |
| 1f | A | 0.6 | 2372.0 | 13.3 |
| 1g | A | 0.9 | 2819.6 | 11.4 |
| 1h | A | 1.2 | 3242.4 | 11.5 |
| 1i | A | 1.5 | 2577.4 | 10.7 |
| 2 | B | 0.15 | 451.5 | 5.3 |
| 3a | C | 0.11 | 190.5 | 3.5 |
| 3b | C | 0.25 | 463.5 | 5.7 |
| 4 | D | 0.16 | 325.2 | 4.9 |
| 5a | E | 0.23 | 228.7 | 5.1 |
| 5b | E | 0.44 | 755.1 | 11.8 |
| 6 | F | 0.14 | 447.4 | 6.3 |
| Comp. 2 | — | — | 21.0 | 1.5 |
| 7 | A | 0.30 | 455.7 | 4.8 |

Comparative Example 3

A silicone composition was prepared by combining 99.71 parts of Silicone Base B and 0.29 part of Crosslinking Agent. The mixture was blended for 25 s using an AM 501 Hauschild dental mixer set at high speed and then for 60 s by hand using a spatula. The thermal conductivity and durometer of the cured silicone product are shown in Table 2.

Example 8

A silicone composition was prepared by combining 99.71 parts of Silicone Base B, 0.29 part of Crosslinking Agent, and 0.01 part of Surfactant A. The mixture was blended for 25 s using an AM 501 Hauschild dental mixer set at high speed and then for 60 s by hand using a spatula. The thermal conductivity and durometer of the cured silicone product are shown in Table 2.

Example 9

A silicone composition was prepared using the method of Example 8 and the following concentrations of components: 99.71 parts of Silicone Base B, 0.29 part of Crosslinking Agent, and 0.06 part of Surfactant A. The thermal conductivity and durometer of the cured silicone product are shown in Table 2.

Example 10

A silicone composition was prepared using the method of Example 8 and the following concentrations of components: 99.71 parts of Base B, 0.29 part of Crosslinking Agent, and 0.11 part of Surfactant A. The thermal conductivity and durometer of the cured silicone product are shown in Table 2.

Example 11

A silicone composition was prepared using the method of Example 8 and the following concentrations of components: 99.71 parts of Base B, 0.29 part of Crosslinking Agent, and 0.15 part of Surfactant A. The thermal conductivity and durometer of the cured silicone product are shown in Table 2.

Example 12

A silicone composition was prepared using the method of Example 8 and the following concentrations of components: 99.71 parts of Base B, 0.29 part of Crosslinking Agent, and 0.30 part of Surfactant A. The thermal conductivity and durometer of the cured silicone product are shown in Table 2.

Example 13

A silicone composition was prepared using the method of Example 8 and the following concentrations of components: 99.71 parts of Base B, 0.29 part of Crosslinking Agent, and 0.61 part of Surfactant A. The thermal conductivity and durometer of the cured silicone product are shown in Table 2.

Example 14

A silicone composition was prepared using the method of Example 8 and the following concentrations of components: 99.71 parts of Base B, 0.29 part of Crosslinking Agent, and 0.91 part of Surfactant A. The thermal conductivity and durometer of the cured silicone product are shown in Table 2.

Example 15

A silicone composition was prepared using the method of Example 8 and the following concentrations of components: 99.71 parts of Base B, 0.29 part of Crosslinking Agent, and 1.20 parts of Surfactant A. The thermal conductivity and durometer of the cured silicone product are shown in Table 2.

Example 16

A silicone composition was prepared using the method of Example 8 and the following concentrations of components: 99.71 parts of Base B, 0.29 part of Crosslinking Agent, and 1:53 parts of Surfactant A. The thermal conductivity and durometer of the cured silicone product are shown in Table 2.

TABLE 2

| Example | Silicone Polyether Copolymer | Wt % | Thermal Cond. W/mK | Durometer (Shore 00) |
|---|---|---|---|---|
| Comp. 3 | — | — | 1.642 | 75 |
| 8 | A | 0.01 | 1.587 | 77 |
| 9 | A | 0.06 | 1.585 | 76 |
| 10 | A | 0.11 | 1.644 | 75 |

TABLE 2-continued

| | Silicone Polyether | | Thermal Cond. | Durometer |
|---|---|---|---|---|
| Example | Copolymer | Wt % | W/mK | (Shore 00) |
| 11 | A | 0.15 | 1.610 | 76 |
| 12 | A | 0.30 | 1.642 | 75 |
| 13 | A | 0.61 | 1.627 | 72 |
| 14 | A | 0.90 | 1.592 | 79 |
| 15 | A | 1.19 | 1.618 | 77 |
| 16 | A | 1.51 | 1.584 | 77 |

That which is claimed is:

1. A silicone composition for preparing a cured silicone product, the composition comprising:

(A) an organopolysiloxane containing an average of at least two silicon-bonded alkenyl groups per molecule;

(B) an organohydrogenpolysiloxane containing an average of at least two silicon-bonded hydrogen atoms per molecule in a concentration sufficient to cure the composition;

(C) an alumina filler in a concentration sufficient to impart thermal conductivity to the cured silicone product;

(D) an effective amount of a polyether; and (E) a catalytic amount of a hydrosilylation catalyst.

2. The silicone composition according to claim 1, wherein the organopolysiloxane is a polydiorganosiloxane having the formula $R^2R^1_2SiO(R^1_2SiO)_aSiR^1_2R^2$ wherein each $R^1$ is independently selected from monovalent hydrocarbon and monovalent halogenated hydrocarbon groups free of aliphatic unsaturation; $R^2$ is alkenyl, and a has a value such that the viscosity of the polydiorganosiloxane at 25° C. is from 0.005 to about 100 Pa·s.

3. The composition according to claim 1, wherein the concentration of component (B) is sufficient to provide from 0.3 to 2.0 silicon-bonded hydrogen atoms per alkenyl group in component (A).

4. The composition according to claim 1, wherein the alumina filler comprises alumina particles having an average size of from 0.2 to 20 μm.

5. The composition according to claim 1, wherein the alumina filler comprises calcined alumina.

6. The composition according to claim 1, wherein the alumina filler is prepared by treating the surfaces of alumina particles with an organosilicon compound.

7. The composition according to claim 1, wherein the concentration of component (C) is from 70 to 85 percent by weight, based on the total weight of the composition.

8. The composition according to claim 1, wherein the polyether is selected from a polyoxyalkylene and a polyorganosiloxane-polyoxyalkylene copolymer.

9. The composition according to claim 8, wherein the polyoxyalkylene has a formula selected from: $R^5O(CH_2CH_2O)_bR^5$, $R^5O[CH_2CH(CH_3)O]_bR^5$, $R^5O(CH_2CH(CH_2CH_3)O)_bR^5$, and $R^5O(CH_2CH_2O)_c[CH_2CH(CH_3)O]_dR^5$, wherein each $R^5$ is independently hydrogen, $R^6$, or —C(=O)—$R^6$, wherein $R^6$ is a monovalent hydrocarbon or monovalent halogenated hydrocarbon group, and b has a value such that the average molecular weight of the polyoxyalkylene is from about 1000 to about 35,000, and c+d=b.

10. The composition according to claim 8, wherein the polyorganosiloxane-polyoxyalkylene copolymer has the general formula:

$$R^8R^7_2SiO(R^7_2SiO)_e(R^9R^7SiO)_fSiR^7_2R^8$$

wherein each $R^7$ is a monovalent hydrocarbon group, $R^8$ is $R^7$ or $R^9$, $R^9$ is a polyoxyalkylene group having a general formula selected from:

$$—R^{10}(OCH_2CH_2)_gOR^{11}$$

and $$—R^{10}(OCH_2CH_2)_h(OCH_2CH(CH_3))_iOR^{11}$$

wherein $R^{10}$ is a divalent hydrocarbon group having from 2 to 20 carbon atoms; $R^{11}$ is selected from hydrogen, alkyl groups having 1 to 4 carbon atoms and acyl groups having from 2 to 6 carbon atoms; e has a value of from 8 to 250, f has a value of from 4 to 50, g has a value of from 5 to 60, h+i=g, and h/i=0.5:1 to 2:1.

11. The composition according to claim 1, wherein the concentration of component (D) is from 0.1 to 1 percent by weight, based on the total weight of the composition.

12. The composition according to claim 1, wherein the hydrosilylation catalyst comprises platinum.

13. The silicone composition according to claim 1, further comprising a hydrosilylation catalyst inhibitor.

14. The composition according to claim 1, further comprising an adhesion promoter.

15. The silicone composition according to claim 14, wherein the adhesion promoter is selected from (i) an adhesion promoter prepared by mixing at least one polysiloxane having at least one silicon-bonded alkenyl group and at least one silicon-bonded hydroxy group per molecule, and at least one epoxy-functional alkoxysilane and (ii) at least one organopentasiloxane having the formula:

$$AMe_2Si(OMe_2Si)_3OSiR^{15}{}_{4-p}(OR^{15})_{p-1}$$

wherein A is hydrogen or an aliphatically unsaturated monovalent hydrocarbon group, $R^{15}$ is alkyl, and p is an integer from 2 to 4.

16. A cured silicone product comprising a reaction product of the composition of claim 1.

17. A cured silicone product comprising a reaction product of the composition of claim 5.

18. A cured silicone product comprising a reaction product of the composition of claim 8.

19. A cured silicone product comprising a reaction product of the composition of claim 14.

20. A multi-part silicone composition for preparing a cured silicone product, the composition comprising:

(A) an organopolysiloxane containing an average of at least two silicon-bonded alkenyl groups per molecule;

(B) an organohydrogenpolysiloxane containing an average of at least two silicon-bonded hydrogen atoms per molecule in a concentration sufficient to cure the composition;

(C) an alumina filler in a concentration sufficient to impart thermal conductivity to the cured silicone product;

(D) an effective amount of a polyether; and (E) a catalytic amount of a hydrosilylation catalyst; provided components (A), (B), and (E) are not present in the same part.

* * * * *